US009582822B2

United States Patent
Glass et al.

(10) Patent No.: US 9,582,822 B2
(45) Date of Patent: Feb. 28, 2017

(54) SYSTEM AND METHOD FOR DIGITAL DELIVERY OF REVEAL VIDEOS FOR ONLINE GIFTING

(71) Applicant: GIFT CARD IMPRESSIONS, LLC, Kansas City, MO (US)

(72) Inventors: Brett R. Glass, Kansas City, MO (US); Dominique Michelle Pierron O'Hara, Kansas City, MO (US)

(*) Notice: Subject to any disclaimer, the term of this patent is extended or adjusted under 35 U.S.C. 154(b) by 0 days.

(21) Appl. No.: 15/295,756

(22) Filed: Oct. 17, 2016

(65) Prior Publication Data

US 2017/0032437 A1 Feb. 2, 2017

Related U.S. Application Data

(60) Division of application No. 14/822,683, filed on Aug. 10, 2015, now Pat. No. 9,471,144, which is a continuation-in-part of application No. 14/231,349, filed on Mar. 31, 2014, now Pat. No. 9,104,237.

(51) Int. Cl.
| | | |
|---|---|---|
| G06F 3/00 | (2006.01) |
| G06F 3/01 | (2006.01) |
| G06Q 30/06 | (2012.01) |
| G06F 3/0488 | (2013.01) |
| G06F 3/16 | (2006.01) |
| G06T 13/20 | (2011.01) |
| G06T 11/60 | (2006.01) |
| G06F 17/24 | (2006.01) |

(52) U.S. Cl.
CPC ......... *G06Q 30/0621* (2013.01); *G06F 3/016* (2013.01); *G06F 3/017* (2013.01); *G06F 3/04883* (2013.01); *G06F 3/167* (2013.01); *G06Q 30/0643* (2013.01); *G06F 17/248* (2013.01); *G06T 11/60* (2013.01); *G06T 13/20* (2013.01)

(58) Field of Classification Search
CPC ..... G06Q 30/0621; G06F 3/016; G06F 3/017; G06F 3/04883
See application file for complete search history.

(56) References Cited

U.S. PATENT DOCUMENTS 7,290,705 B1 * 11/2007 Shin ................... G06Q 20/18
235/379
8,280,825 B2 * 10/2012 Friedman .............. G06Q 30/02
705/26.1

(Continued)

FOREIGN PATENT DOCUMENTS

AU WO 2014015365 A1 * 1/2014 ............. G06Q 30/06
CA WO 2014029026 A1 * 2/2014 ......... G06F 3/04817

*Primary Examiner* — Nicholas Augustine
(74) *Attorney, Agent, or Firm* — Polsinelli PC

(57) ABSTRACT

An electronic gift (e-gift) giving system includes a first computing device that receives from a second computing device of a giver, e-gift information associated with an e-gift to be given to a recipient and reveal video information from the second computing device. From this information, the first computing device generates an interactive reveal video that, when displayed on a recipient computing device of the recipient, receives one or more user interface input actions and generates one or more tactile feedback actions to be performed by the second computing device in response to the user interface input action.

17 Claims, 15 Drawing Sheets

(56) References Cited

U.S. PATENT DOCUMENTS

| | | | |
|---|---|---|---|
| 2009/0199275 A1* | 8/2009 | Brock | G06F 3/04815 726/4 |
| 2011/0010251 A1* | 1/2011 | Silva | G06Q 30/0277 705/14.73 |
| 2011/0041086 A1* | 2/2011 | Kim | G06F 3/0488 715/764 |
| 2011/0289411 A1* | 11/2011 | Kulkarni | G11B 27/034 715/719 |
| 2013/0144733 A1* | 6/2013 | Rothschild | G06Q 20/0457 705/17 |
| 2014/0058873 A1* | 2/2014 | Sorensen | G06Q 30/0601 705/26.1 |
| 2014/0074654 A1* | 3/2014 | Friedman | G06Q 30/02 705/26.7 |
| 2014/0074704 A1* | 3/2014 | White | G06Q 20/353 705/41 |
| 2014/0081769 A1* | 3/2014 | Wilen | G06Q 20/354 705/14.66 |
| 2014/0108177 A1* | 4/2014 | Erke | G06Q 30/0601 705/26.1 |
| 2014/0164159 A1* | 6/2014 | Lovelace | G06Q 30/0601 705/26.1 |
| 2014/0207659 A1* | 7/2014 | Erez | G06Q 30/0633 705/39 |

\* cited by examiner

Fig. 5

Settings

[Sign In]

[Need Help?]

[Terms of Service]

[Done]

Fig. 6

Sign In

E-mail: [        ]

Password: [        ]

[Sign In]

Fig. 7

Register New Account

"Creating an account will save your billing address for future purchases."

E-mail: [        ]

Password: [        ]

Confirm Password: [        ]

[Register]

[Checkout as Guest]

[◀ Back]   [Continue ▶]

Fig. 8

Recipient Information

Name: [        ]

E-mail: [        ]

[Message ▼]

[◀ Back]   [Continue ▶]

Fig. 9

Recipient Information

Recipient Location: _____
Recipient Age: _____
3 Likes/Interests: _____
Naughty? Why? _____

◀ Back    Continue ▶

Fig. 10

Select a Gift Card

▲

Merchant 1

Merchant 2

Merchant 3

Select a Gift Card

◀ Style 2 ▶

Merchant ID

Select Amount
$50.00 ▼

◀ Back    Continue ▶

Fig. 12

Select an Occasion

| Congratulations |
| Birthday |
| Wedding |
| New Baby |
| Back to School |
| Just Because |
| Graduation |
| Holiday |

(SHAKING MOVEMENT)

SYSTEM AND METHOD FOR DIGITAL DELIVERY OF REVEAL VIDEOS FOR ONLINE GIFTING

RELATED APPLICATIONS

The present application is a divisional of Ser. No. 14/822,683, entitled "System And Method For Digital Delivery Of Reveal Videos For Online Gifting," filed on Aug. 10, 2015, which is a continuation-in-part to application Ser. No. 14/231,349, entitled "System And Method For Digital Delivery Of Reveal Videos For Online Gifting", filed on Mar. 31, 2014, which issued as U.S. Pat. No. 9,104,237, on Aug. 11, 2015.

FEDERALLY SPONSORED RESEARCH OR DEVELOPMENT

Not Applicable.

COMPACT DISK APPENDIX

Not Applicable.

FIELD OF INVENTION

The present invention generally relates to online gifting, and more particularly, to a system and method for digital delivery of reveal videos for online gifting.

BACKGROUND

Electronic gifts (e-gifts) such as transaction cards, stored value cards, electronic tickets, gift cards, and stored value cards have become a popular mode of online gifting. For example an e-gift may include a stored value card having a specified cash equivalent value that may be redeemed by a conventional or online merchant. The stored value is determined by the merchant prior to packaging and display for sale or is selected at the point of sale by the purchaser. Nevertheless, these e-gifts, per se, lack any aesthetic qualities that may be useful for enhancing online gifting experiences. Additionally, the online gifting of e-gifts often do not adequately convey a sentiment that a giver would like to provide to his or her recipient. It is with these features in mind that embodiments of the present disclosure have been developed.

SUMMARY

According to one aspect of the present disclosure, an electronic gift (e-gift) giving system includes a server that receives from a computing device of a giver, e-gift information associated with an e-gift to be given to a recipient and reveal video information from the computing device. From this information, the server generates an interactive reveal video that, when displayed on a computing device of the recipient, receives one or more user interface input actions and generates one or more tactile feedback actions to be performed by the computing device in response to the user interface input action.

According to another aspect of the present disclosure, an e-gift gifting method includes the steps of receiving, by a server, e-gift information associated with an e-gift to be given to a recipient, and reveal video information from a computing device. Using this information, the server an interactive reveal video that receives one or more user interface input actions and generates one or more tactile feedback actions to be performed by the computing device in response to the user interface input action.

According to yet another aspect of the present disclosure, a reveal video display system includes a recipient computing device that receives, from a server, an interactive reveal video that, when played on the recipient computing device, receives one or more user interface input actions and generates one or more tactile feedback actions to be performed by the recipient computing device in response to the user interface input actions. The interactive reveal video is generated by the server according to electronic gift information and reveal video information provided by a user computing device managed by a user.

BRIEF DESCRIPTION OF THE DRAWINGS

FIG. 5 illustrates an example of a settings page of a user interface according to an aspect of the e-gift ordering system.

FIG. 6 illustrates an example of a sign in screen of a user interface according to an aspect of the e-gift ordering system.

FIG. 7 illustrates an example of a registration screen of a user interface according to an aspect of the e-gift ordering system.

FIG. 8 illustrates an example of a recipient information entry screen of a user interface according to an aspect of the e-gift ordering system.

FIG. 9 illustrates an example of a recipient information entry screen of a user interface according to an aspect of the e-gift ordering system.

FIG. 10 illustrates an example of an e-gift selection screen of a user interface according to an aspect of the e-gift ordering system.

FIG. 11 illustrates an example of an e-gift customization screen of a user interface according to an aspect of the e-gift ordering system.

FIG. 12 illustrates an example of an occasion selection screen of a user interface according to an aspect of the e-gift ordering system.

DETAILED DESCRIPTION

Although e-gifts have become a commonly accepted gifting medium, their use has not been without limitation. For example, conventional e-gifts are generally impersonal in that they typically do not include any personal sentiment that the user (i.e., sender) would like to convey to his or her recipient. Embodiments of the present disclosure provide a solution to this problem using an e-gift ordering server that generates a reveal video to be electronically sent along with an e-gift that embellishes upon a gifting experience for a recipient.

Figure 1A:
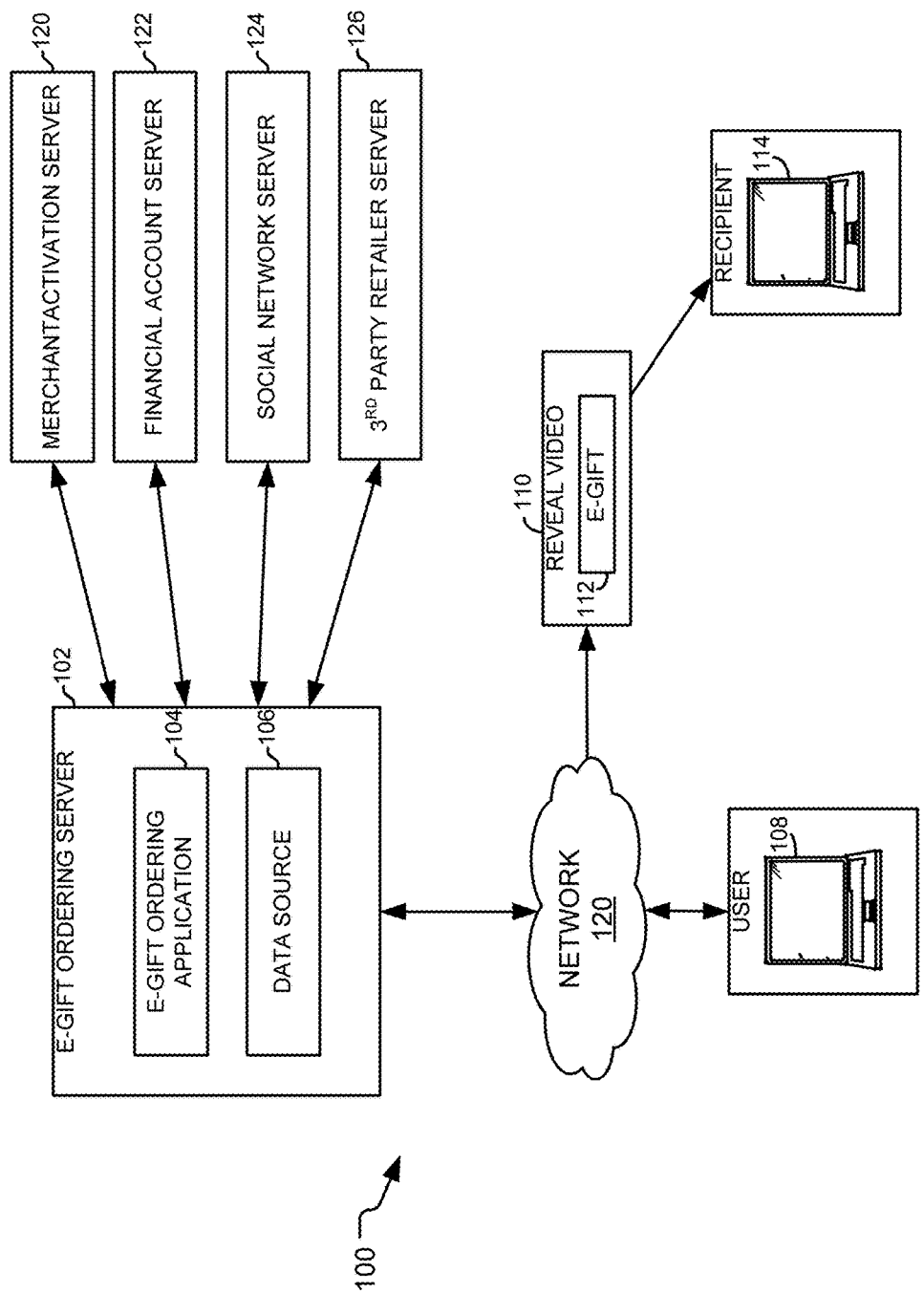
FIG. 1A is a block diagram of a computing system that includes an e-gift ordering server according to an aspect of the e-gift ordering system.
Figure 1B:
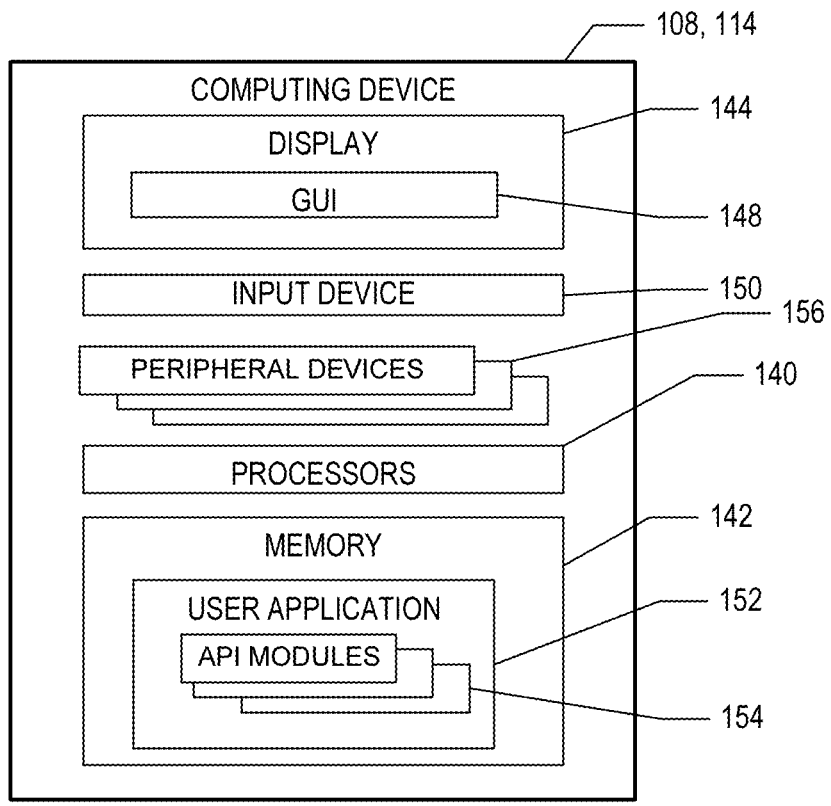
FIG. 1B depicts an exemplary embodiment of a computing device according to one aspect of the e-gift ordering system.
Figure 1C:
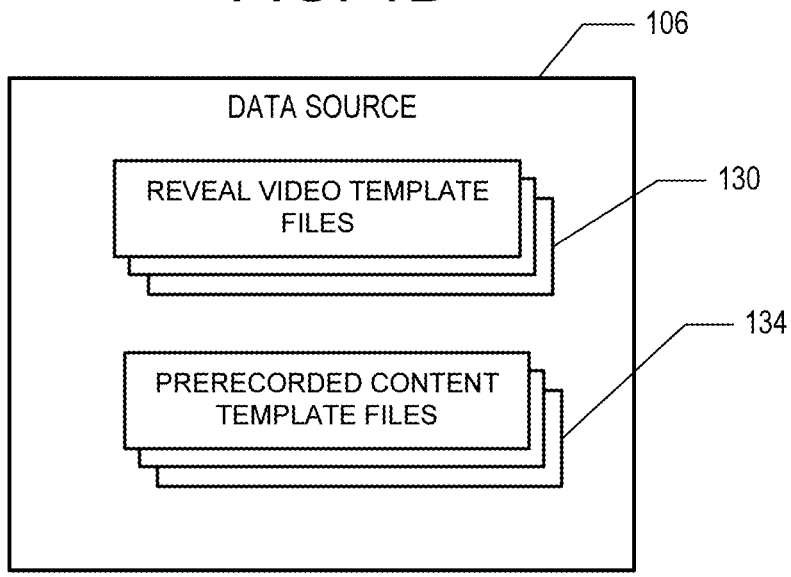
FIG. 1C depicts an exemplary embodiment of a data source according to an aspect of the e-gift ordering system.

FIGS. 1A through 1C depict an example e-gift ordering system 100 according to aspects of the disclosure. The system 100 includes an e-gift ordering server 102 that includes an e-gift ordering application 104 and a data source 106. As will be described in detail below, the e-gift ordering application 104 receives information from a computing device 108 of a user, and generates a reveal video 110 for transmission to a recipient along with a selected e-gift 112. The reveal video/e-gift combination is transmitted, for example, to a computing device 114 of the recipient via a messaging service, such as e-mail, a short message service (SMS), or a multimedia message service (MMS), or other suitable digital communication medium.

The server 102 communicates with a merchant activation server 120 to activate the e-gift, and a financial account server 122 that is associated with a financial account of the user to provide payment for the activated e-gift by the user. The financial account is any type, such as a credit card account, a debit card account, a mobile payment system account (e.g., GOOGLE WALLET™ account), or a PAYPAL™ account of the user. Prior to activation of the e-gift, the server 102 facilitates a financial transaction between the merchant activation server 120 and the financial account server 122 associated with the user to provide payment for the e-gift.

The server 102 communicates with a social network server 124 to obtain information about the user and/or recipient for suggesting additional content to be included with the reveal video/e-gift combination. The server 102 also communicates with a third party retailer server 126 to provide generation, customization, and transmission of reveal videos 110 for a third party retailer. Additionally, the server 102 communicates with the social network server 124 to obtain information/data about the user and/or recipient for suggestions regarding events or any special occasions (e.g., birthdays, anniversaries, weddings, expected graduation dates, and the like) associated with the user and/or recipient. For example, the server 102 may obtain information associated with a friend of the user indicating that the friend has an upcoming anniversary, and present this information to the user along with any e-gift/reveal video designs related to anniversaries so that the user can optionally select a particular gift card/reveal video design to send to the friend (e.g., recipient).

The merchant activation server 120, the financial account server 122, the social network server 124, and the third party retailer server 126 each have one or more processors and executable instructions stored in volatile and/or non-volatile memory for performing the actions and/or steps described herein.

The data source 106 stores information that is used by the sender to activate an e-gift, and generate a customized reveal video 110 to be sent to the recipient. In the particular embodiment shown, the data source 106 stores one or more reveal video template files 130, and one or more pre-recorded content files 134. In other embodiments, the data source 106 stores any suitable type of information for personalizing the reveal video by the user. Although the data source 106 is shown as being located on, at, or within the server 102, it is contemplated that the data source 106 can be located remotely from the server 102 in other aspects of the system 100, such as on, at, or within a database of a data management system or a database of another computing device or system having at least one processor and volatile and/or non-volatile memory.

Although not shown, the data source 106 may also store information to be used for generating other forms of content to be transmitted to the recipient. For example, the data source 106 may store information for generating an electronic gift card holder (e-gift card holder), and/or a teaser video to be transmitted along with the e-gift to the recipient. Examples of such a system is described in U.S. patent application Ser. No. 13/940,436, entitled Gift Card Ordering System and Method, which was filed on Jul. 12, 2013, the contents of which are incorporated by reference in its entirety.

The communication network 120 can be the Internet, an intranet, or another wired and/or wireless communication network. In one aspect, one or more of the server 102 and the computing device 108 communicate with one another using any suitable protocol or messaging scheme. For example, the server 102 and computing device 108 communicates using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing device 108 through a network, other embodiments contemplate the server 102 communicating directly with the computing device 108 without the use of a separate and a distinct network. Additionally, other embodiments contemplate that the modules employed by the server 102 and the computing device 108 are integrated in one computing system. Further, the servers 120, 122, and 124 alternatively communicate with the merchant activation server 102 via the network 120.

The user accesses the system 100 via the computing device 108 hosted by the e-gift ordering server 102 using an HTML link or other suitable entry point, such as through application software (i.e., a mobile app) executed on a portable computing device, such as a wireless communication device. The e-gift ordering application 104 then generates a digital reveal video 110/e-gift 112 combination that is digitally transmitted to the recipient using an e-mail message, a short message service (SMS), via a social media account, or other suitable digital communication medium. The reveal video 110, when played by the computing device 114 of the recipient, receives one or more user interface input actions and in response, generates one or more tactile feedback actions on the computing device 114 for simulating a gifting experience for the recipient.

The reveal video 110 may be incorporated in any suitable format that provides a multimedia viewing experience for the recipient. For example, the reveal video 110 may include audio and recorded video content obtained from a camera and stored in a format such as a motion picture experts group 3 (MPEG-3) format, a MPEG-4 format, a H.265 format, or an OGG multimedia format. The reveal video 110 may also include animated video content such as may be stored and displayed in a HTML5 format. Additionally, the reveal video 110 may include a combination of recorded video content and animated video content using a combination of formats discussed herein above.

FIG. 1B depicts an example embodiment of a computing device 108, 114 that may be used by a user (i.e., giver) and a recipient, respectively, according to one aspect of the e-gift ordering system 100. The computing device 108, 114 is a computing or processing device that includes one or more processors 140 and memory 142. For example, the computing device 108, 114 can be a personal computer, such as a laptop or notebook computer, a workstation, or other processing device such as a personal digital assistant or a tablet computer. The computing device 108, 114 includes a display 144, such as a computer monitor, for displaying data and/or a graphical user interface 148. The computing device 108, 114 also includes an input device 150, such as a keyboard or a pointing device (e.g., a mouse, trackball, pen, or touch screen) to enter data into or interact with the graphical user interface 148. In one embodiment, the display 144 comprises a touch-screen device in which input is provided via contact by the user with the touch-screen device. The computing device 108, 114 receives data and/or communications from, and/or transmit data and/or communications to, the server 102 via the communication network 120.

The computing device 108, 114 includes a user application 152 stored in the memory 142 and executed on the processors 140 to generate the graphical user interface (GUI) 148 to the display 104. The graphical user interface 148 enables the computing device 108, 114 of the user to interact with one or more data entry forms received from the server 102 to enter order detail data and submit orders to the application 104. In one embodiment, the user application 152 includes a web browser that displays interactive web pages, applets, or other suitable user interface mechanisms including one or more selectable fields, editing screens, and the like for selecting content and/or modifying pre-recorded content by the user (i.e., sender). In another embodiment, the GUI application 152 includes application software (i.e., a mobile app) that is executed on the computing device 108, 114, which is, for example, a wireless communication device for providing one or more selectable fields, edit screens, and the like for selecting content and/or modifying pre-recorded content by the user.

According to an aspect of the present disclosure, the user application 152 also includes one or more application program interface (API) modules 154 for communicating with one or more peripheral devices 156 configured in the computing device 108, 114. For the computing device 114 of the recipient, the API modules 154 include any type that receives user interface input actions, and generates tactile feedback using one or more peripheral devices 156. For the computing device 108 of the user, the API modules 154 may receive user-supplied content from the user for generating the reveal video 110. For example, the API modules 154 of the computing device 114 of the recipient may communicate with sensors for sensing finger gestures performed by the recipient and cooperate with one or more other API modules 154 for generating tactile feedback for the recipient using peripheral devices (e.g., speaker, vibration generators, or rumble feedback generators). As another example, the API modules 154 may include a keyboard for receiving alpha-numeric text information from the user, a microphone for receiving audio content from the user, and/or a camera for receiving photographic or video content from the user.

Figure 2:
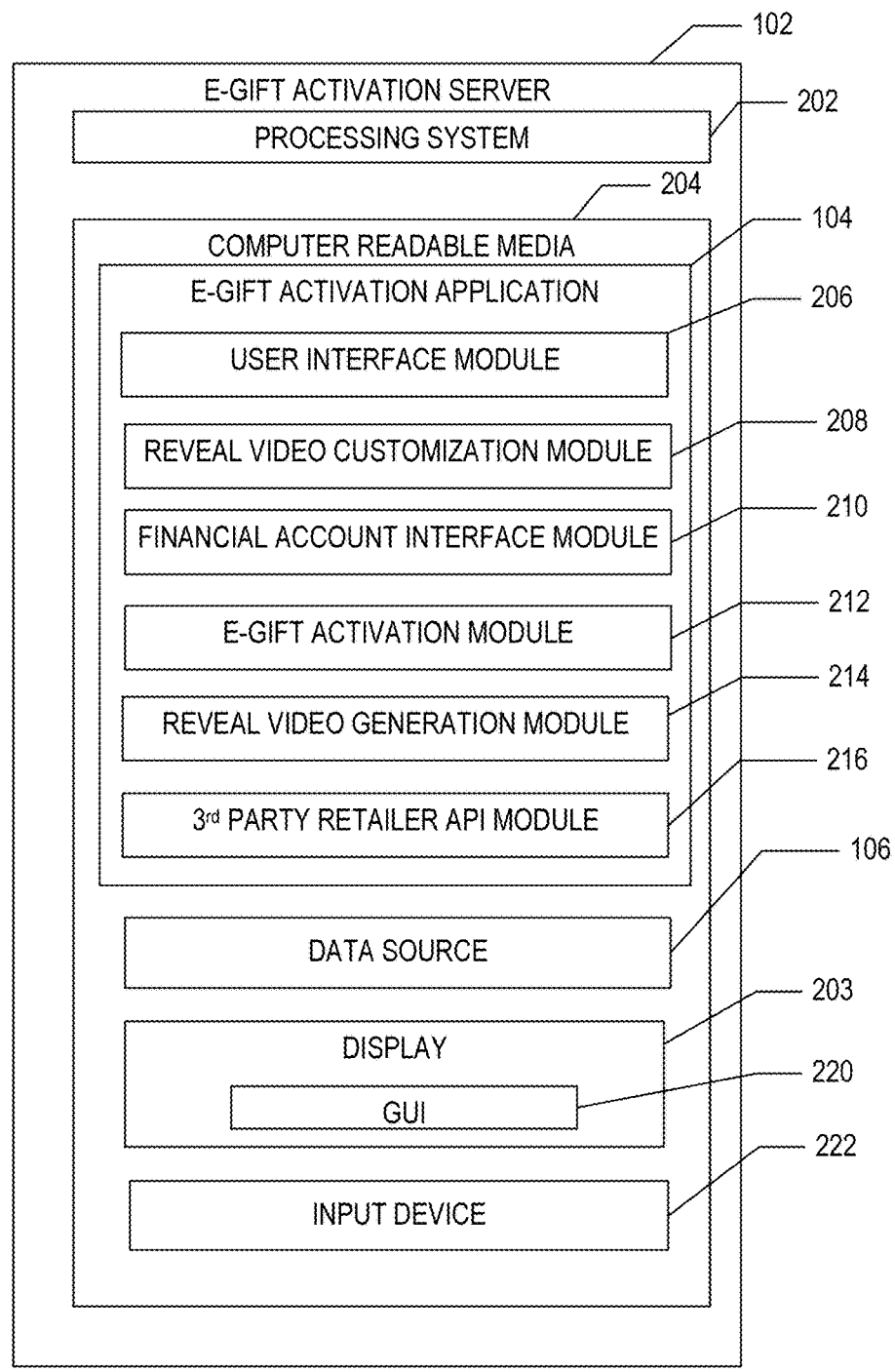
FIG. 2 is a block diagram of a computing system that executes an e-gift ordering application according to an aspect of the e-gift ordering system.

FIG. 2 illustrates an example e-gift ordering application 104 executed on the e-gift ordering server 102. The e-gift ordering server 102 includes a processing system 202 that includes one or more processors or other processing devices. A processor is hardware. The processing system 202 executes the e-gift ordering application 104 to facilitate activation of an e-gift and for receiving customized information from the user for generating a reveal video that is combined with the e-gift to be sent to a recipient. The e-gift ordering server 102 also includes a display 203, such as a computer monitor, for displaying data and/or a graphical user interface 220.

According to one aspect, the e-gift ordering server 102 includes a computer readable medium 204 that stores the e-gift ordering application 104. The e-gift ordering application 104 includes instructions or modules that are executable by the processing system 202 to generate a reveal video to be sent to a recipient along with a selected e-gift.

The computer readable medium 204 includes volatile media, nonvolatile media, removable media, non-removable media, and/or another available medium that can be accessed by the e-gift ordering server 102. By way of example and not limitation, computer readable medium 204 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of data and/or other communications from the computing device 108 of the user. In one example, the user interface module 206 communicates with the computing device 108 using a web browser executed on the computing device 108 to provide one or more selectable fields, editing screens, and the like for receiving content and/or modifying pre-recorded content by the user (i.e., sender) to be included in the reveal video 110. In another example, the user interface module 206 communicates with the computing device 108 using application software (i.e., a mobile app) executed on a computing device 108, such as a wireless communication device or tablet computer, to provide one or more selectable fields, editing screens, and the like for receiving content and/or modifying pre-recorded content by the user (i.e., sender). In yet another example, the user interface module 206 communicates with one or more peripheral devices 156 of the computing device 108 to receive user-supplied content to be included on the reveal video and/or the gift card.

A reveal video customization module 208 receives information from the computing system 108 for customizing a reveal video 110. For example, the reveal video customization module 208 displays one or more reveal video templates stored in the data storage and receives selection of one of the displayed reveal video templates by the user. Next, the reveal video customization module 208 receives other information from the computing device 108 of the user for customizing the reveal video, which may include, for example, selection of a particular color scheme to be associated with the reveal video, entry of user-supplied content, and/or selection of one or more pre-recorded content to be included with the reveal video. For example, the reveal video customization module 208 receives user selection of a holder type including a particular design associated with a special occasion, which is, for example, a birthday, wedding, or a holiday, such as Christmas, Easter, Thanksgiving, and the like. The user-supplied content may include alphanumeric text, photographs, audio content, recorded video content, and/or animated video content as provided by the user. For example, the reveal video customization module 208 receives textual content from the user that includes a sentimental message to be included in the reveal video to be viewed by the recipient.

The user-supplied content or pre-recorded content may include textual, audio, photographs, and/or video segments to be included with the reveal video. In a particular embodiment, the user-supplied content includes pre-recorded content including a song or a portion of a pre-recorded song that is copyrighted and licensed by the owner of the copyrighted song. The reveal video customization module 208 modifies existing content, such as pre-recorded content or other previously received content, based upon input received from the computing system 108. An example of modifying existing content includes modifying a received photograph using one or more photograph editing features that provides for cropping, color hue adjustment, brightness adjustment, sizing, and/or other features associated with manipulation of digital imagery.

A financial account interface module 210 communicates with a payment processing server, such as the financial account server 122, to transact a monetary transfer of funds from the user's financial account to a financial account of a merchant of the e-gift. In one example, the financial account module 210 includes an application program interface (API) for coordinating a monetary transaction (e.g., online money transfer) through an e-commerce provider, such as PAYPAL™, online credit card systems, or other suitable third party financial clearing entity. In another example, the financial account interface module 210 encodes monetary transaction information provided by the user and transmits this information to the merchant activation server 120 such that the merchant activation server 120 may communicate with the financial account server 122 of the user for transacting funds necessary for activating the e-gift.

The e-gift activation API module 212 communicates with the merchant activation server 120 for activation of the e-gift. For example, the merchant activation server 120 is a server managed by a merchant associated with the e-gift. For another example, the merchant activation server 120 is a third party server of a third party e-gift activation service for activation of the e-gift, such as SVS™, STORE FINANCIAL™, and the like.

A reveal video generation module 214 facilitates the generation of the reveal video to be sent to the recipient along with the selected e-gift. For example, the e-gift/reveal video combination is generated in digital form and transmitted to the recipient via any suitable communication mechanism, such as via an e-mail message, or a short message service (SMS) message.

A third party retailer API module 216 exposes certain features of each of the user interface module 206, the reveal video customization module 208, the financial account interface module 210, the e-gift activation API module 212, and/or the reveal video generation module 214 for use by the third party server 126 so that reveal videos 110 may be generated and transmitted to recipients using a website platform owned and managed by a third party retailer. For example, a third party, such as WAL MART™ may provide a publicly available website that allows its users to place orders for e-gifts 112, while also interfacing with the modules 206, 208, 210, 212, and/or 214 to select, customize, generate, and transmit e-gift/reveal video combinations directly from their website.

It should be appreciated that the modules described herein is provided only as an example of a computing device that executes the e-gift ordering application 104 according to the teachings of the present invention, and that other computing systems may have the same modules, different modules, additional modules, or fewer modules than those described herein. For example, one or more modules as described in FIG. 2 is combined into a single module. As another example, certain modules described herein is encoded on, and executed on other computing systems, such as the computing device 108 used by the user, or the computing device 114 used by the recipient.

Figure 3:
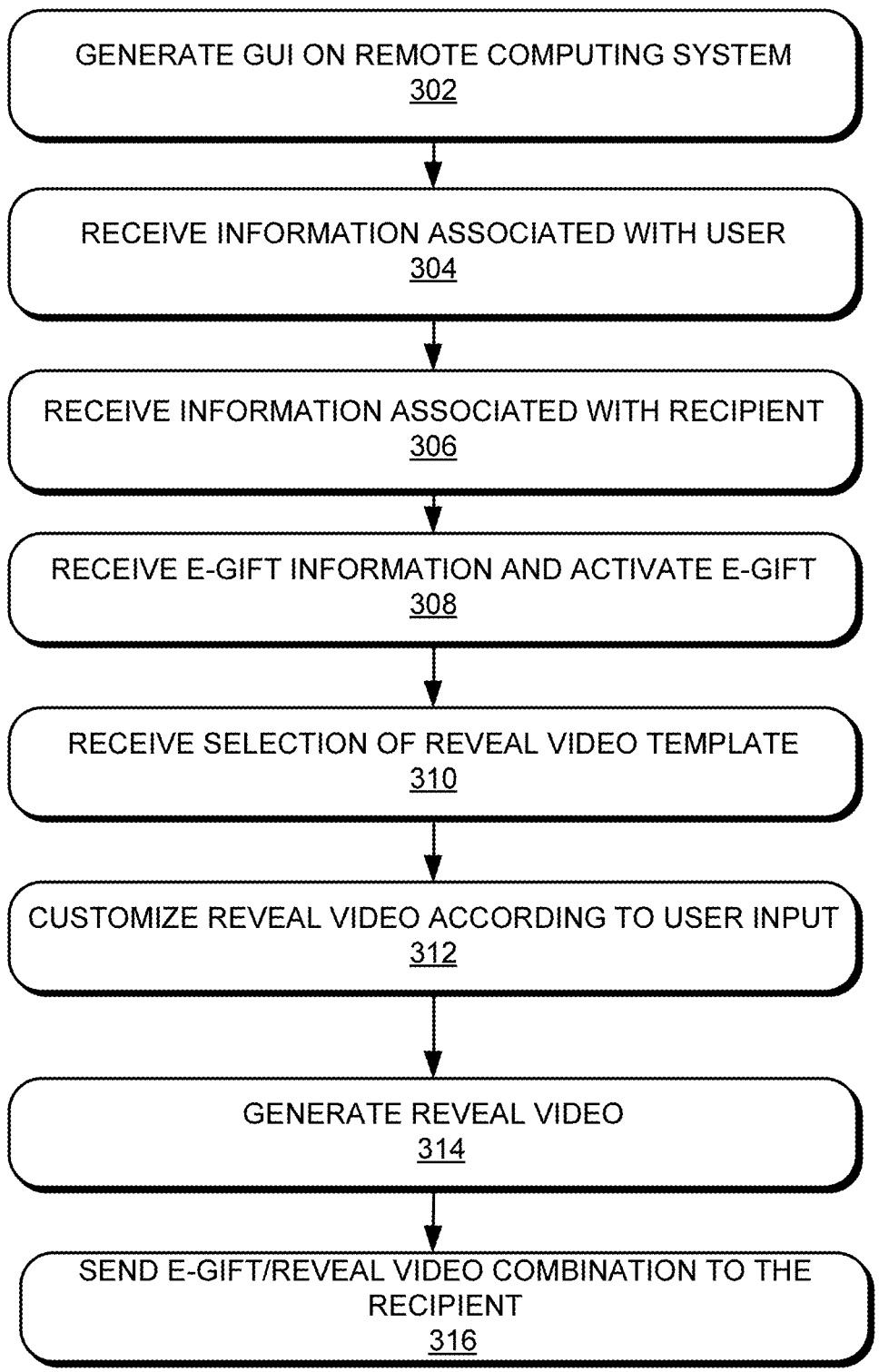
FIG. 3 is a flowchart depicting a process for creating a personalized reveal video according to an aspect of the e-gift ordering system.

FIG. 3 illustrates an example process that is performed by the e-gift ordering application 104 to generate a reveal video that may be transmitted, along with a selected e-gift to a recipient according to the teachings of the present disclosure.

At 302, the e-gift ordering application 104 receives a request from a computing device 108 and generates a GUI on the computing system 108 of the user. In one embodiment, the GUI is generated as a web page that is rendered by a web browser executed on the computing device 108 through a network, such as the Internet. In another embodiment, the GUI is generated by application software (i.e., a mobile app) designed to be executed on a computing device 108 embodied as a wireless communication device, a tablet computer, or other similar type of portable computing device.

The user accesses the system 100 via the computing device 108 via the user interface of the computing device 108 hosted by the e-gift ordering server 102. A user may arrive at the system interface via an HTML link or other suitable entry point, such as through a mobile app executed on a portable computing device. The user typically initiates the online personalized gifting transaction by requesting a URL of the server 102 through a browser or by launching the mobile app on a portable computing device, such as a wireless communication device or portable tablet computer from which the GUI is generated on the computing device 108.

In some embodiments incorporating a mobile app that is executed on a portable computing device, a first or main screen display is provided showing elements such as text and graphics describing and explaining use of the system. The main screen may also display one or more banners showing seasonal offers provided to the user. In certain embodiments, the user can scroll through multiple banners using a finger swipe or other means, such as arrow keys, provided by the portable computing device for controlling and interacting with the mobile app executed on the portable computing device. Typically, the main screen also includes text and graphics comprising a primary navigation element, such as a "Get Started" button, that is activated by a screen touch or other selection means provided by the mobile device to advance the user to the next screen.

Figure 4:
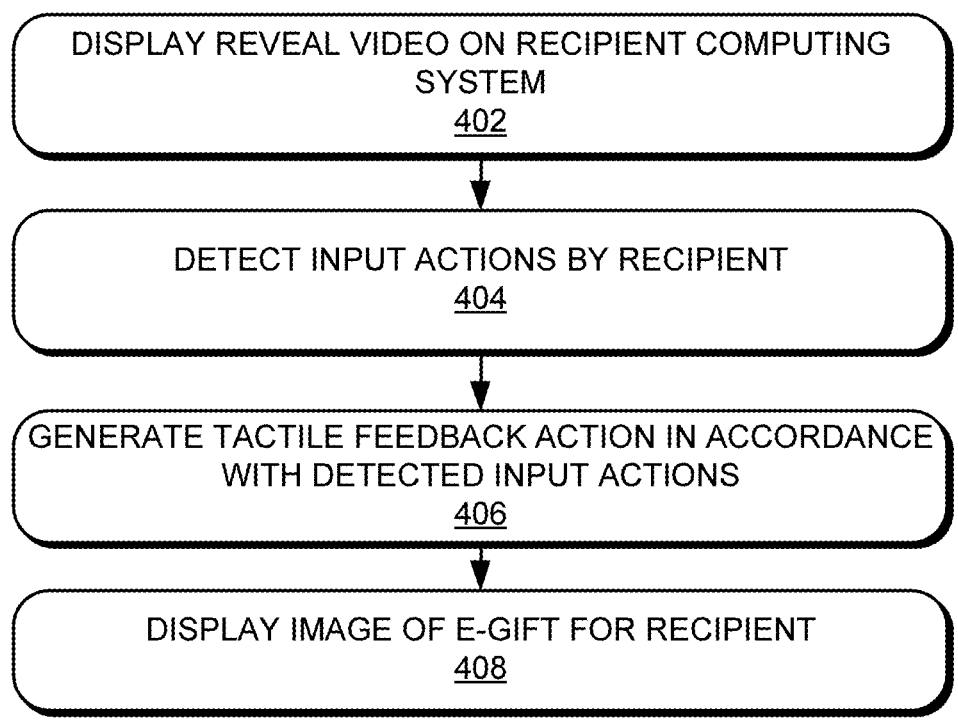
FIG. 4 is a flowchart depicting a process for playing the reveal video on a computing device of a recipient according to one aspect of the e-gift ordering system.
Figure 13:
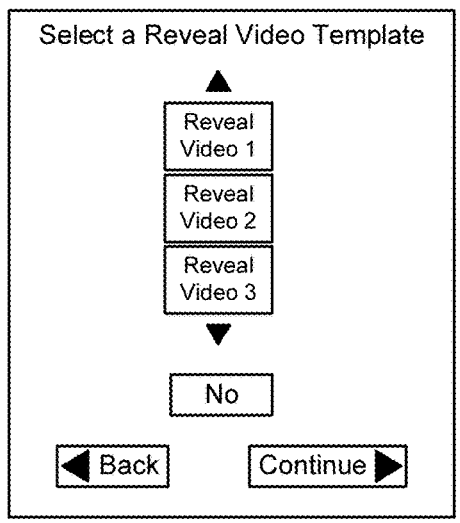
FIG. 13 illustrates an example of a reveal video selection screen of a user interface according to an aspect of the e-gift ordering system.
Figure 14:
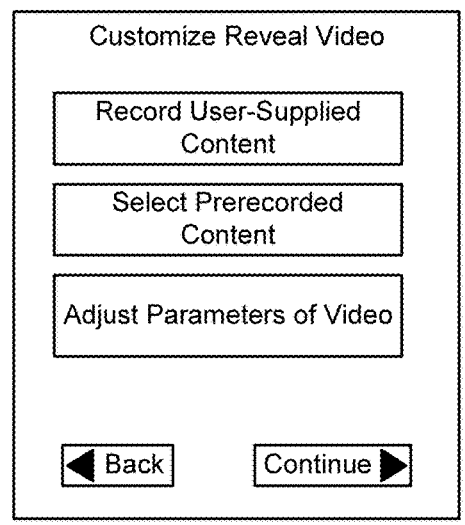
FIG. 14 illustrates an example of a reveal video customization screen of a user interface according to an aspect of the e-gift ordering system.
Figure 15:
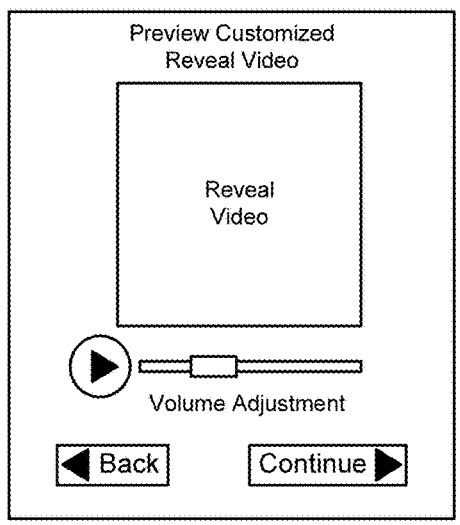
FIG. 15 illustrates an example of a reveal video preview screen of a user interface according to an aspect of the e-gift ordering system.

At 304, the e-gift ordering application 104 receives information associated with the user. For example, the e-gift ordering application 104 generates a splash screen (FIG. 4) on the computing device from which a sign-in screen (FIG. 5) is accessed by the computing device. In the event that the user has not yet established an account, the e-gift ordering application 104 generates a registration screen (FIG. 6) on the computing device for registration of the user. In other embodiments, information associated with the user without the splash screen, sign-in screen, and registration screen as shown in FIGS. 4-6, respectively if registration of the user is not needed or desired. It is important to note that the screens of FIGS. 5-24 of the present disclosure may refer to screens generated by a mobile app on a computing device, such as smartphone as well as screens generated by a web browser on a computing device, such as a home computing system.

At 306, the e-gift ordering application 104 receives information associated with a recipient. For example, the e-gift ordering application 104 generates a recipient information screen (FIG. 7) to receive one or more identifying elements of the recipient from the user. The e-gift ordering application 104 also generates a second recipient information screen (FIG. 8) to receive one or more other elements of information of the recipient, such as a location where the recipient resides, an age of the recipient, and any interests of the recipient. It is important to note that FIGS. 7 and 8 merely show one embodiment of recipient information that is received by the e-gift ordering application 104; other examples however, provides for receipt of any type of recipient information. Alternatively, the e-gift ordering application 104 obtains personal information of the recipient using one or more social network sites, such as FACE-BOOK™. As will be described in detail below. The e-gift ordering application 104 uses this information to provide targeted suggestions to the user for designing the reveal video and/or selection of a e-gift.

At 308, the e-gift ordering application 104 receives e-gift information from the computing device 108 and facilitates activation of the e-gift. For example, the e-gift ordering application 104 may present a merchant selection screen (FIG. 9) for entry of a particular merchant of the e-gift, which upon selection by the user, then displays a e-gift selection screen (FIG. 10) and a e-gift customization screen (FIG. 11), which in this particular example is configured to provide for selection and customization of a gift card of the selected merchant. The e-gift selection screen also provides for selection of a monetary value to be associated with the e-gift. Although the present example describes an e-gift in the form of a gift card, it should be understood that the e-gift may be any type that facilitates an item of value or facilitates a financial transaction for the recipient, such as a transaction card, a stored value card, an electronic ticket, or a stored value card, a subscription, a coupon, an e-book, a group coupon e.g., GROUPON™), and the like.

At 310, the e-gift ordering application 104 receives reveal video information from the computing device 108. For example, the e-gift ordering application 104 presents an occasion screen (FIG. 12) for entry of a particular occasion by a user of the computing device 108. As another example, the e-gift ordering application 104 presents a reveal video template selection screen (FIG. 13) for selection of a particular reveal template to be customized. For a particular example in which the selected occasion is Christmas, the e-gift ordering application 104 presents multiple reveal video templates associated with the Christmas season, such as a manger scene, a Christmas tree, three wise men, and the like. The e-gift ordering application 104 receives a selected occasion from the computing device 108 of the user for further customization.

At 312, the e-gift ordering application 104 customizes the reveal video according to reveal information provided by the user. For example, the application 104 presents a reveal video customization screen (FIG. 14) to manage the entry of reveal video information by the user. For example, the interactive screen includes a "Record User-Supplied Content" button that when selected, allows the user to enter user-supplied content, such as textual, audio, photographic, and/or video content to be included in the reveal video. As another example, the interactive screen includes a "Select Prerecorded Content" button that when selected, allows the user to select from among multiple instances of prerecorded content stored in the data source. As yet another example, the interactive screen includes a "Adjust parameters of the Video" button that when selected, allows the user to adjust one or more parameters of the reveal video, such as a color scheme to be associated with the reveal video, a play time of the reveal video, haptic feedback intensity parameters to be associated with the reveal video, and the like. The e-gift ordering application 104 also displays a reveal video preview screen (FIG. 15) that displays a preview of the customized reveal video so that the user may view the reveal video.

At 314, the e-gift ordering application 104 generates a reveal video in accordance with information provided by the user of the computing device at 302 through 310. At 316, the e-gift ordering application 104 transmits the reveal video/e-gift combination to the recipient. The e-gift ordering application 104 transmits the reveal video/e-gift combination to the user via any suitable digital format, such as via an e-mail message, via a short message service (SMS) message, or via a social media account.

The process described above is performed repeatedly for additional reveal video/e-gifts to be sent to one or more recipients. When use of the e-gift ordering application 104 is no longer needed or desired, the process ends.

FIG. 4 illustrates an example process that is performed by the user application 152 of the computing device 114 of the recipient to play the customized reveal video according to the teachings of the present disclosure.

Figure 16:
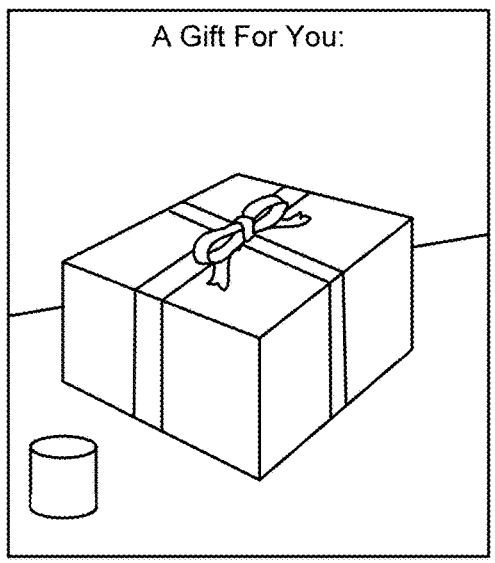
FIGS. 16-18 illustrate an example reveal video comprising a three-dimensional image of a present that is interactively opened by the recipient according to an aspect of the e-gift ordering system.
Figure 17:
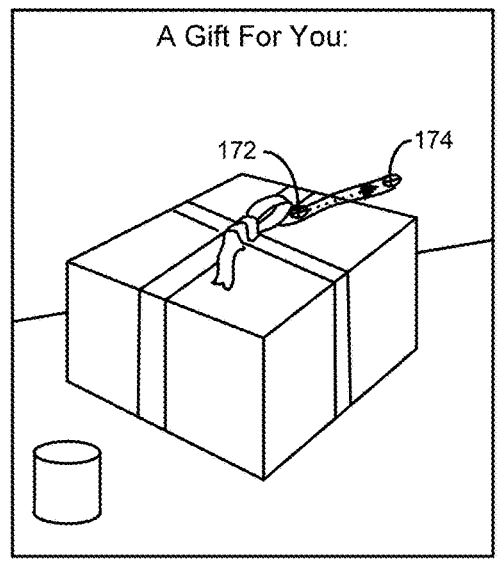
Figure 18:
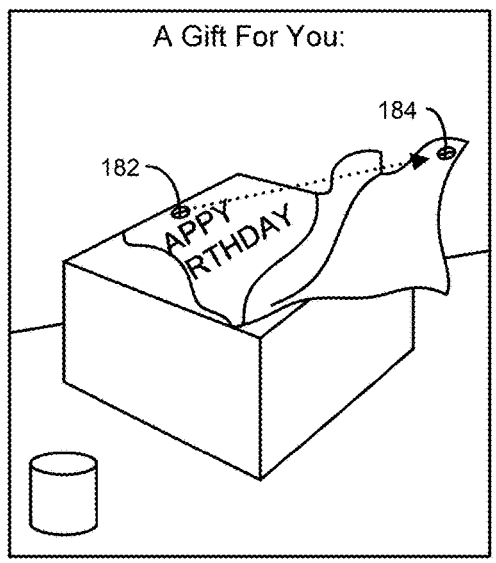
Figure 19:
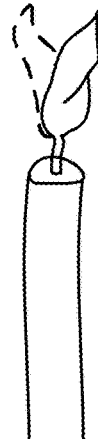
FIGS. 19-21 illustrate an example reveal video comprising an image of a birthday candle that may be interactively blown out by the recipient according to an aspect of the e-gift ordering system.

At 402, the user application 152 displays the reveal video on the GUI 148 of the computing device 114. One example reveal video may display a three-dimensional image of a present (FIGS. 16-18) to be interactively opened by the recipient. Another example reveal video may display an image of a birthday candle (FIGS. 19-21) that may be interactively blown out by the recipient. Another example reveal video may display an image of a balloon (FIGS. 22-23) to be blown up by the recipient. Yet another example reveal video may display an image including confetti or other celebration material (FIGS. 24-26) that may be removed to reveal the e-gift given to the recipient. In one embodiment, the reveal video may include background imagery, such as an image of a table on which a gift box is placed as shown in FIGS. 16-18. Additionally, the displayed image may include simulated movement, such as the birthday candle whose flame may flicker to simulate movement due to the ambient forces of the wind as shown in FIG. 19.

At 404, the user application 152 detects one or more input actions performed on the GUI 148. Examples of input actions may include, for example, finger swiping actions performed on the GUI 148 of the computing device 114, audible sound inputted into a microphone of the computing device 114, shaking, tilting, popping, and/or tapping of the computing device 114.

At 406, the user application 152 generates tactile feedback actions in accordance with the detected input actions. For the example reveal video shown in FIGS. 16-18, tactile feedback actions include an image of a ribbon that is pulled in response to an input action comprising a finger swiping action from point 172 to point 174 on the GUI 148. Additionally as shown in FIG. 18, a tactile feedback action may include an image of wrapping paper being ripped from the e-gift in response to an input action comprising a finger swiping action from point 182 to point 184 on the GUI 148.

Other tactile feedback actions may include sounds outputted by a speaker or other sound generating device of the computing device 114 that mimics or simulates an actual sound generated by visual displays on the GUI 148. For example, the user application 152 may generate a tearing sound as the wrapping paper is pulled from the e-gift as shown in FIG. 18. Additionally, the user application 152 may generate vibrations of the computing device 114 to simulate texture or other sensory aspect of the displayed image. For example, the user application 152 may generate vibrations as the wrapping paper is removed to simulate the tearing action in the user's hand.

Figure 20:
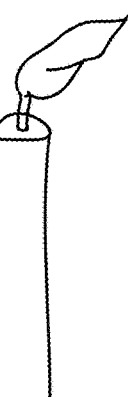
Figure 21:
Figure 22:
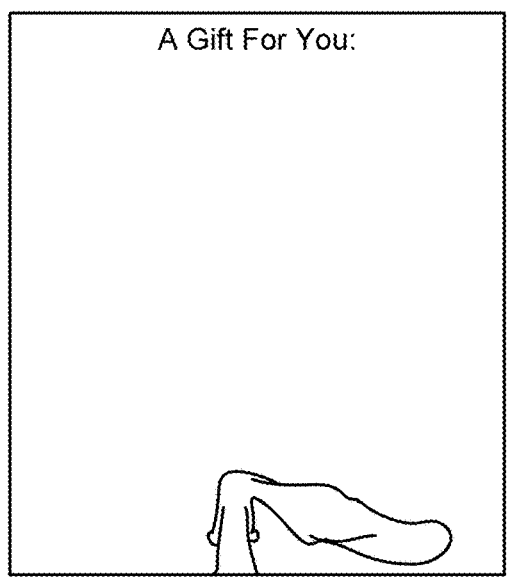
FIGS. 22-23 illustrate an example reveal video comprising an image of a balloon that may be interactively blown up by the recipient according to an aspect of the e-gift ordering system.
Figure 23:
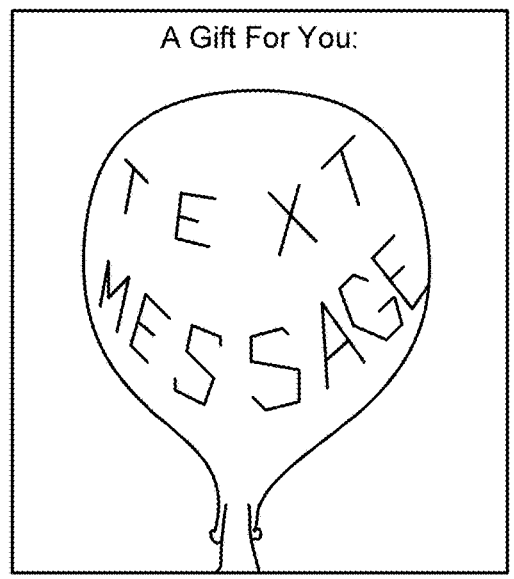
Figure 24:
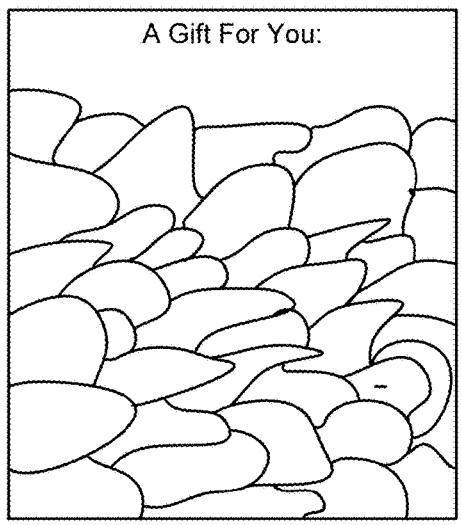
FIGS. 24-26 illustrate an example reveal video comprising an image of confetti or other celebration-based material that may be removed via haptic input movements from the recipient in order to reveal an e-gift according to an aspect of the e-gift ordering system.

Tactile feedback actions may include an image of a burning candle whose flame bends or an image of a balloon that is blown up in response to an input action of blowing into the microphone of the computing device 114 by the user as shown in FIGS. 20 and 23, respectively. As the user continues to blow into the microphone, the user application 114 responds by displaying a burned out candle as shown in FIG. 21. The balloon may also display a user-supplied text message indicating some sentiment to be conveyed to the recipient by the giver.

Figure 25:
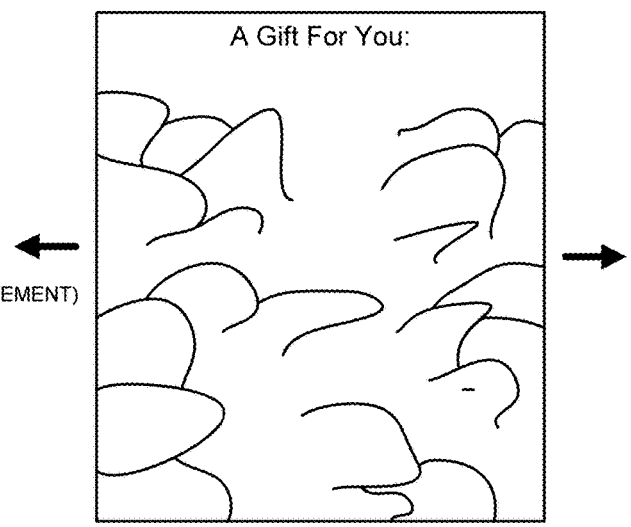

Tactile feedback actions may also include an image of confetti as shown in FIG. 25 that is removed from the GUI 148 as the user shakes the computing device 114.

Figure 26:
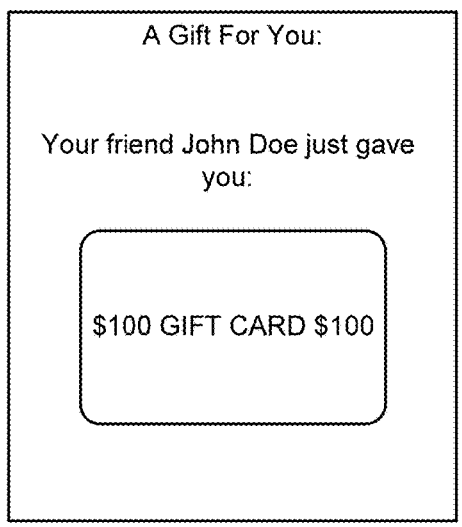
Figure 27:
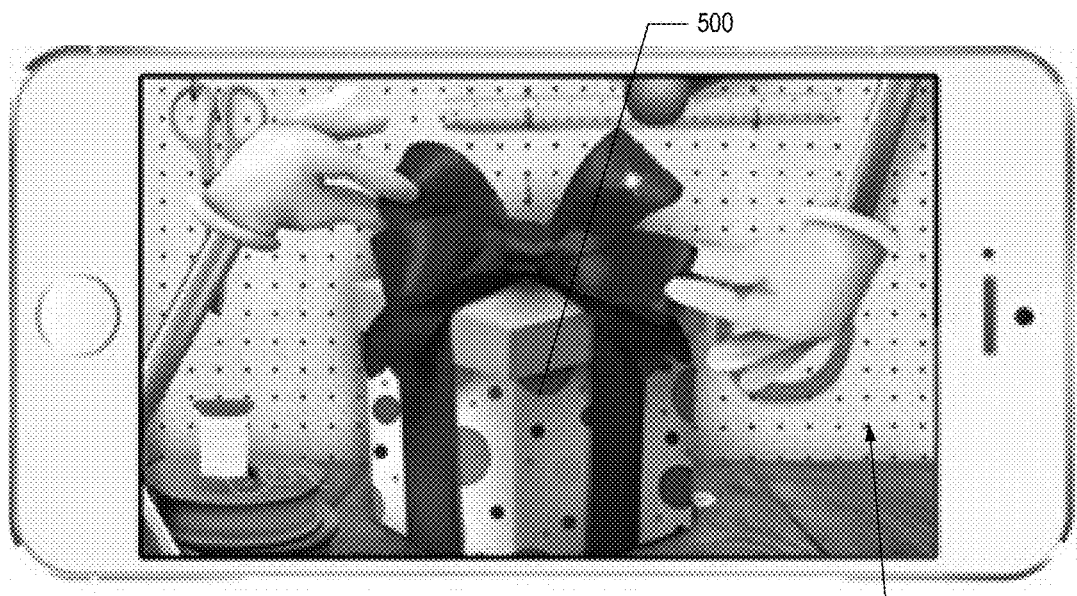
FIGS. 27-29 are screenshots from an example reveal video sequence according to one embodiment.
Figure 28:
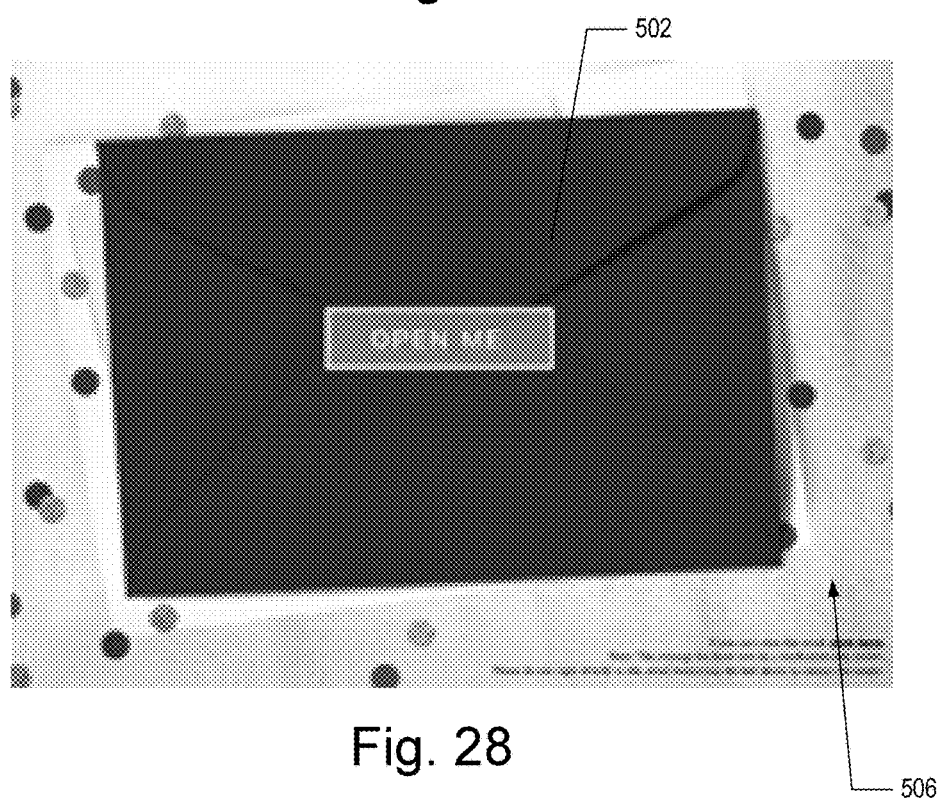
Figure 29:
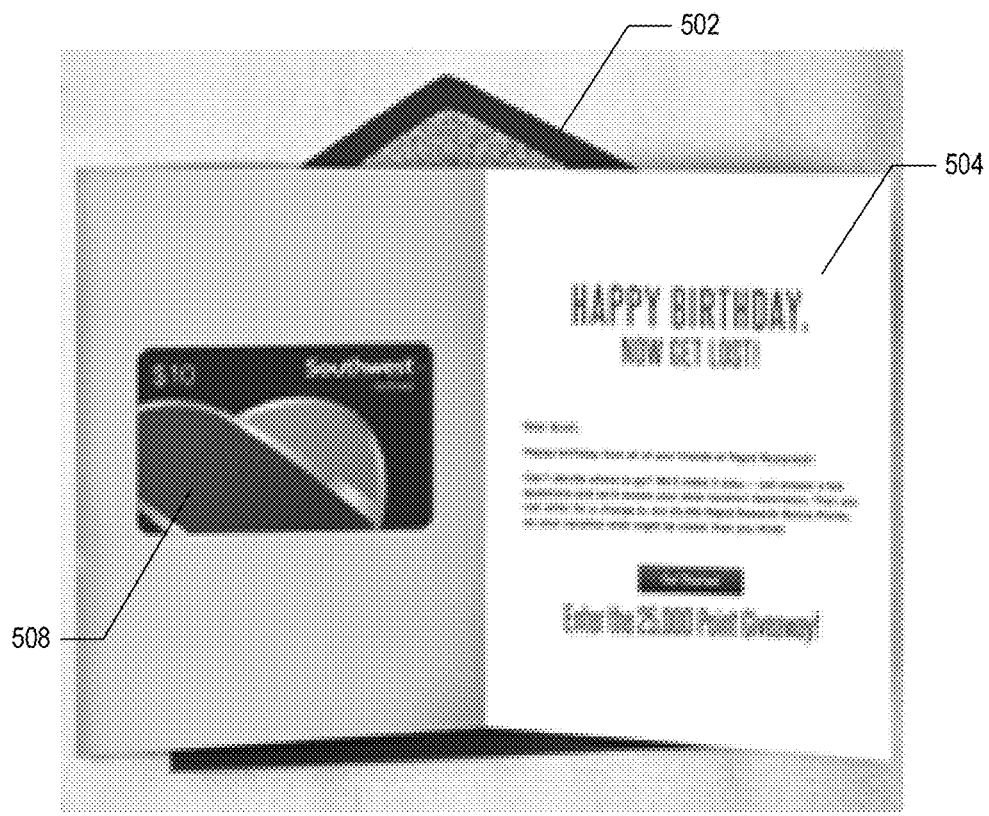

At 408, the user application 152 displays an image of the e-gift for the recipient. For example, an image of the e-gift may be displayed as a box that is revealed when the wrapping paper is tore away as shown in FIG. 18. As another example, an image of the e-gift may be displayed as a stored value card (e.g., a gift card) that is revealed when the candle is blown out as shown in FIG. 21, or when the confetti is shaken from the GUI 148 as shown in FIG. 26.

The process described above may be performed repeatedly for the user on the GUI 148. Nevertheless, when display of the reveal video is no longer needed or desired, the process ends. It should be appreciated that the steps described herein is provided only as an example of a process that is performed by the user application 152 to display a reveal video on the computing device 114 of the recipient and that the user application 152 may perform fewer, more, or different types of steps than those described herein. For example, the user application 152 may perform multiple steps described above as a single step. As another example, certain steps described herein is performed by other components of the computing device 114 of the recipient.

According to an embodiment of the systems and methods disclosed herein, additional reveal videos and graphic displays can be used to reveal a gift to a recipient. Similar to the previously described methods, at 402, the user application 152 displays a reveal video on the GUI 148 of the computing device 114. One example reveal video may include one or more animation sequences. These sequences may include images of a wrapped gift box 500, a sealed envelope 502, and a greeting card 504, as shown in FIGS. 27-31. In various embodiments, the reveal video sequences may include background imagery 506, such as an image of a table on which a gift box is placed or other decorative backgrounds.

At 404, the user application 152 detects one or more input actions performed on the GUI 148. Examples of input actions may include, for example, finger swiping actions performed on the GUI 148 of the computing device 114 or shaking, tilting, popping, and/or tapping of the computing device 114. At 406, the user application 152 generates tactile feedback actions in accordance with the detected input actions. For the example reveal video sequence in FIGS. 27-29, the user opens or retrieves an email, social media message, or text message that is delivered to the computing device and the gift box 500 is displayed. The user then performs a swiping action on the GUI 148 to open the gift box 500. In response to the swiping action, the user application 152 generates and displays an animated sequence that illustrates the gift box 500 opening and confetti spilling out. The sealed envelope 502 is then displayed as a result of opening the gift box. The user then performs a second interaction, such as a finger swipe to open the envelope 502. Another animation sequence is displayed that depicts the greeting card 504 emerging from the envelope 502. A gift, such as a gift card 508 is then revealed from within the greeting card. In one embodiment, a third user interaction is required to open the greeting card 504. One having ordinary skill in the art can understand and appreciate that the entire animation reveal sequence may be displayed in response to any number of user interactions, as such a fewer number or a greater number of "opening" steps may be performed by the user.

Other tactile feedback actions may include sounds outputted by a speaker or other sound generating device of the computing device 114 that mimics or simulates an actual sound generated by visual displays on the GUI 148. For example, the user application 152 may generate a tearing sound as the sealed envelope 502 is unsealed, as the greeting card 504 is opened, or as the gift card 508 is removed from the greeting card. Additionally, the user application 152 may generate vibrations of the computing device 114 to simulate texture or other sensory aspect of the displayed image. For example, the user application 152 may generate vibrations as the wrapping paper or lid is removed from the gift box 500.

At 408, the user application 152 displays an image of the e-gift for the recipient. For example, an image of the e-gift may be displayed as an image of a gift that is revealed when greeting card is opened. In one example, an image of the gift may be displayed as a stored value card (e.g., a gift card) that is revealed when the envelope and greeting card held therein are opened in response to the user interactions.

In another embodiment, the user performs yet another interaction to access the e-gift. For example, after performing a series of interactive gestures to access and open a greeting card, such as the greeting card 504, the user may perform one or more additional interactive gestures, including but not limited to a finger swipe, blowing into a microphone of the computing device 114, shaking the computing device, or tapping on the GUI 148 to reveal an access code associated with the e-gift depicted. The access code may then be used to access a retail or merchant website or may be used directly to retrieve the gift.

Figure 30:
FIGS. 30-31 are screenshots from a portion of another reveal video sequence according to one embodiment.
Figure 31:
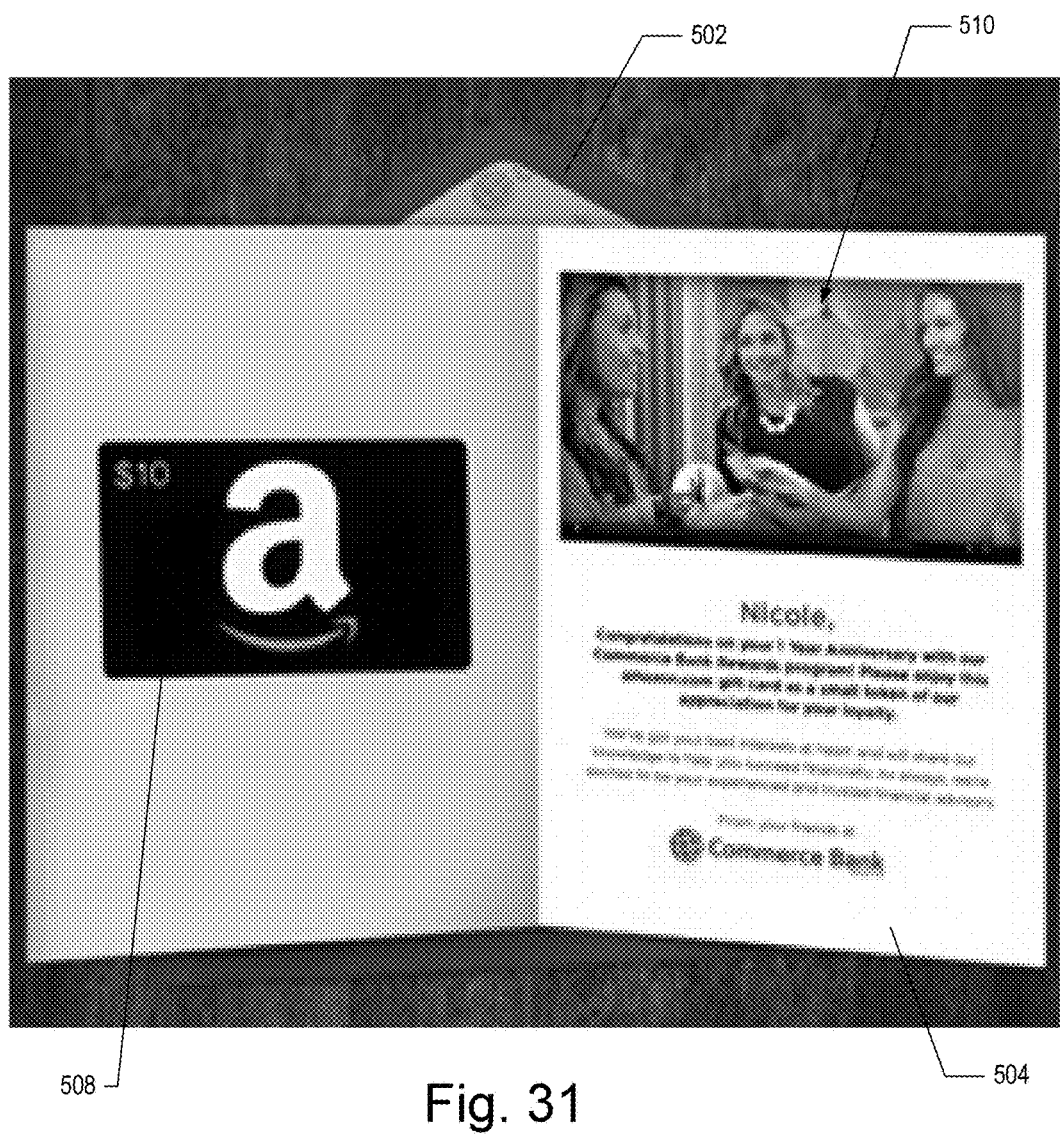

In yet another example, a portion of the reveal video sequence, as shown in FIGS. 30-31, the user opens or retrieves an email, social media message, or text message that is delivered to the computing device and the envelope 502 is displayed. The user performs an interactive gesture, such as a finger swipe to open the envelope 502. An animation sequence is displayed that depicts the greeting card 504 emerging from the envelope 502. Once the greeting card is opened, as previously described, the GUI displays an image from a personalized video 510 that includes user-supplied content related to the recipient. The user performs an interactive gesture, which may include tapping the displayed image to retrieve and play the personalized video 510.

In various embodiments, an image of an e-gift, such as an image of a stored value card, may be displayed simultaneously with the video or may be displayed after the personalized video 510 has been displayed. Once the e-gift is displayed, the user may perform one or more additional interactive gestures, including but not limited to a finger swipe, blowing into a microphone of the computing device 114, shaking the computing device, or tapping on the GUI 148 to reveal an access code associated with the e-gift depicted. The access code may then be used to access a retail or merchant website or may be used directly to retrieve the gift.

The process described above may be performed repeatedly for the user on the GUI 148. Nevertheless, when display of the reveal video is no longer needed or desired, the process ends. It should be appreciated that the steps described herein is provided only as an example of a process that is performed by the user application 152 to display a reveal video on the computing device 114 of the recipient and that the user application 152 may perform fewer, more, or different types of steps than those described herein. For example, the user application 152 may perform multiple steps described above as a single step. As another example, certain steps described herein are performed by other components of the computing device 114 of the recipient.

It should be understood that the e-gifts described herein above merely represent example e-gifts that is used with the present disclosure, and that other types or styles of e-gifts is used. For example, the e-gift may be printable on a conventional piece of paper that includes indicia indicating information, such as a merchant and the monetary amount allocated to that e-gift that may be redeemed by the merchant.

Those skilled in the art will appreciate that variations from the specific embodiments disclosed above are contemplated by the invention. The invention should not be restricted to the above embodiments, but should be measured by the following claims.

What is claimed is:

1. An electronic gift (e-gift) gifting system comprising:
a first computing device comprising at least one processor; and
at least one memory for storing an application executed on the at least one processor to:
receive, by the first computing device, e-gift information associated with an e-gift, to be given to a recipient from a second computing device, wherein the e-gift is available for purchase from a merchant;
generate, by the first computing device, a reveal presentation template for display;
receive, by the first computing device, multimedia information from the second computing device, wherein the multimedia information includes user-supplied content related to the recipient and wherein the user-supplied content includes alpha-numeric text, photographs, audio content, video content, pre-recorded video content, animated content, or combinations thereof;
generate, by the first computing device, a personalized interactive reveal presentation comprising the user-supplied content composited into one or more editable fields of the reveal presentation template and the personalized interactive reveal presentation comprising one or more other animations, one or more other HTML5 animations, one or more other image sequences, one or more other videos, or combinations thereof, wherein the personalized interactive reveal presentation receives a user interface input action and generates a tactile feedback action to be performed at a recipient computing device in response to the user interface input action during display of the personalized interactive reveal presentation;
wherein the user interface input actions comprise a tap, touch, or swiping action across a display of the recipient computing device, and wherein the tactile feedback actions comprises unsealing a displayed package in response to the tap, touch, or swiping action and then displaying an image of the e-gift, a gift card, or a gift card holder comprising the user-supplied content related to the recipient; and
wherein the user-supplied content related to the recipient, an image of the e-gift, the gift card and the access code are displayed, in response to the user interface input actions, at the recipient computing device.

2. The system of claim 1, wherein the personalized interactive reveal presentation comprises an image of a gift box, the user interface input action comprising a finger swiping action on a user interface of the recipient computing device, and the tactile feedback action comprising an image showing movement of a ribbon or tearing of wrapping paper.

3. The system of claim 2, wherein the tactile feedback action comprises an audio segment generated by a sound generating device of the recipient computing device.

4. The system of claim 2, wherein the personalized interactive reveal presentation comprises a three-dimensional image that includes background imagery.

5. The system of claim 1, wherein the user interface input actions comprises at least one of a shaking action of the recipient computing device, a tilting action of the recipient computing device, a popping action of the recipient computing device, or a tapping action of the recipient computing device.

6. The system of claim 1, wherein the tactile feedback action comprises a rumble feedback action of the recipient computing device.

7. An electronic gift (e-gift) gifting method comprising:
receiving, by at least one processor, e-gift information associated with an e-gift to be given to a recipient from a remote computing device, wherein the e-gift is available for purchase from a merchant;
receiving, by the at least one processor, multimedia information from the second computing device by the first computing device, wherein the multimedia information includes user-supplied content related to the recipient and wherein the user-supplied content includes alpha-numeric text, photographs, audio content, video content, pre-recorded video content, animated content, or combinations thereof;

generating, by the at least one processor, a personalized interactive reveal presentation comprising the user-supplied content composited into one or more editable fields of the personalized interactive reveal presentation, wherein the personalized interactive reveal presentation that receives a user interface input action and generates a tactile feedback action to be performed at a recipient computing device in response to the user interface input action during display of the personalized interactive reveal presentation;

wherein the user interface input action comprises a swiping action across a display of the second computing device, and wherein the tactile feedback actions comprises at least one of unsealing a displayed envelope in response to the swiping action or opening a displayed greeting card comprising the user-supplied content related to the recipient on the recipient computing device; and wherein the user-supplied content related to the recipient and the e-gift or an image of the e-gift are displayed, in response to the user interface input actions, at the recipient computing device.

8. The method of claim 7, further comprising receiving, by the recipient computing device, the user interface input action comprising a finger swiping action on a user interface of the recipient computing device, the personalized interactive reveal presentation comprising an image of a gift box, and the tactile feedback action comprising an image showing movement of a ribbon or tearing of wrapping paper.

9. The method of claim 7, wherein the tactile feedback action generated for performance by the recipient computing device comprises a tearing sound.

10. The method of claim 7, wherein the personalized interactive reveal presentation comprises an image of a candle including a flickering flame responsive to the user interface input action to simulate actual movement of the flame of the candle.

11. An electronic gift (e-gift) gifting system comprising:
a first computing device comprising at least one processor and memory, and the at least one processor to:
receive from a first user device e-gift information associated with an e-gift to be given to a recipient, wherein the e-gift is available for purchase from a merchant;
receive from the first user device, multimedia information from the second computing device, wherein the multimedia information includes user-supplied content related to the recipient and wherein the user-supplied content includes alpha-numeric text, photographs, audio content, video content, pre-recorded video content, animated content, or combinations thereof;
generate and transmit a personalized interactive reveal presentation comprising the user-supplied content composited into one or more editable fields of the personalized interactive reveal presentation, and the personalized interactive reveal presentation comprising one or more other animations, one or more other HTML5 animations, one or more other image sequences, one or more other videos, or combinations thereof;
wherein the personalized interactive reveal presentation generates a tactile feedback action in response to a user interface input action during display of the personalized interactive reveal presentation;
wherein the user interface input action comprises a swiping action across a display of the second computing device, and wherein the tactile feedback action comprises at least one of unsealing a displayed envelope in response to the swiping action or opening a displayed greeting card comprising the user-supplied content related to the recipient on the recipient computing device; and transmit the user-supplied content related to the recipient for display at the device displaying the personalized interactive reveal presentation.

12. An electronic gift (e-gift) gifting system comprising:
a first computing device comprising at least one processor; and
at least one memory for storing an application executed on the at least one processor to:
receive, by the first computing device, e-gift information associated with an e-gift, to be given to a recipient from a second computing device, wherein the e-gift is available for purchase from a merchant;
generate, by the first computing device, a reveal presentation template for display;
receive, by the first computing device, multimedia information from the second computing device, wherein the multimedia information includes user-supplied content related to the recipient and wherein the user-supplied content includes alpha-numeric text, photographs, audio content, video content, pre-recorded video content, animated content, or combinations thereof;
generate, by the first computing device, a personalized interactive reveal presentation comprising the user-supplied content composited into one or more editable fields of the reveal presentation template, wherein the personalized interactive reveal presentation comprises one or more other animations, one or more other HTML5 animations, one or more other image sequences, one or more other videos, or combinations thereof and receives one or more user interface input actions and generates a tactile feedback action to be performed at a recipient computing device in response to the user interface input action during display of the personalized interactive reveal presentation; and
wherein the user interface input actions comprise a tap, touch, or swiping action across a display of the recipient computing device, and wherein the tactile feedback action comprises unsealing a displayed present in response to the tap, touch, or swiping action.

13. The system of claim 12, wherein the personalized interactive reveal presentation comprises an image of a gift box, the user interface input action comprising a finger swiping action on a user interface of the recipient computing device, and the tactile feedback action comprising an image showing movement of a ribbon or tearing of wrapping paper.

14. The system of claim 13, wherein the tactile feedback action comprises an audio segment generated by a sound generating device of the recipient computing device.

15. The system of claim 13, wherein the personalized interactive reveal presentation comprises a three-dimensional image that includes background imagery.

16. The system of claim 12, wherein the user interface input actions comprises at least one of a shaking action of the recipient computing device, a tilting action of the recipient computing device, a popping action of the recipient computing device, or a tapping action of the recipient computing device.

17. The system of claim 12, wherein the tactile feedback action comprises a rumble feedback action of the recipient computing device.

* * * * *